Patented Oct. 22, 1946

2,409,816

UNITED STATES PATENT OFFICE 2,409,816

SUGAR SYRUP AND PROCESS

Daniel V. Wadsworth, Manhasset, N. Y., and Mary F. Hughes, Jersey City, N. J., assignors to Refined Syrups & Sugars, Inc., Yonkers, N. Y., a corporation of New York No Drawing. Application July 2, 1945,
Serial No. 602,918

10 Claims. (Cl. 99—142)

This application is an elaboration and continuation in part of our U. S. application for Letters Patent Serial Number 479,476, filed March 17, 1943.

This invention relates to sugar syrup, and to a process of producing the same. Certain aspects of the invention also relate to the bacteriological treatment of sucrose.

In various foodstuffs (within which term we include liquid foods or drinks), sugar is added for sweetening and also to impart various characteristics, such as consistency, body, and keeping qualities. The sugar may be advantageously added in the form of a syrup; particularly in commercial manufactures of foodstuffs. For this purpose it is economical and expeditious for the foodstuff manufacturer to buy syrup, rather than dry sugar, provided the syrup has the necessary properties.

The syrup should be free from crystallization during handling and storage. Also it preferably should be of high viscosity, to thereby impart greater body or consistency to the foodstuffs, particularly such foodstuffs as fondant, candy, ice cream, etc. In some foodstuffs, e. g., ice cream, it has been customary to incorporate stabilizers to maintain the consistency and body of the finished product while it is awaiting consumption. Desirably, sugar syrup used in such products should have the property of stabilizing the foodstuff without the addition of special stabilizers.

Among the objects of the invention are the provision of a sugar syrup which has high viscosity, that itself is stable against crystallization, that imparts desirable body and consistency to various foodstuffs, and that stabilizes the foodstuffs while they are awaiting consumption.

Among other objects of the invention are the provision of an improved, relatively speedy, and relatively inexpensive process of producing sugar syrup having properties as aforementioned.

A further object of the invention is the provision of an improved, speedy, and more effective process of producing dextran from sucrose.

Various additional objects will be apparent, to those skilled in the art, from a consideration of the following disclosure.

Our process contemplates the production of the dextran gum from sucrose by the bacteriological action of *Leuconostoc mesenteroides* (Cienkowski) Van Tieghem. By means of the usual bacteriological technique of culturing and selection, strains of these organisms may be developed which are acclimated to sucrose liquors of densities well above those ordinarily used in bacteriological processes. So far we have successfully acclimated the organisms to sucrose liquor up to 35° Brix. The acclimated organisms may be kept in any suitable way. We keep them in agar slants.

In carrying out our process of producing dextran, we inoculate a sucrose solution of suitable density with the acclimated organisms from an agar slant. Various sucrose solutions may be used, e. g., solutions of sugars, juices, syrups or molasses derived from cane, beet or other sucrose producing plants. We have found that rapid propagation of the organisms, with rapid production of dextran, may be fostered by vegetable protein-rich nutrients and by maintaining the pH of the solution at an optimum value. The best nutrients known to use are steepwater (a by-product of the cornstarch industry), and water extract of malt sprouts. We have used barley malt sprouts and found them quite suitable.

We also have used yeast extract currently sold by the Difco Laboratories under the brand name "Bacto," sterilized Fleishman's baker's yeast, soya bean extract sold by the Soy Bean Products Company under the brand name "Soyco," dry distiller's solubles from wheat and corn sold by Hiram Walker & Sons, Inc. under the brand name "Stimuflav," wheat protein sold by the Doughnut Corporation of America, and condensed molasses distiller's solubles sold under the brand name "Curbay" (liquid) by the U. S. Industrial Chemical Co., individually, and in various combinations. In some instances, hydrolyzing of the nutrient material was found to be beneficial. The eight nutrients herein disclosed are typical vegetable protein-rich materials commercially available on the open market. While we have found each of these materials to be effective for the production of dextran by our process, the most rapid yield has usually been obtained from the malt sprout and the steepwater; the six others being effective in substantially the order in which they have been mentioned. The incubation is carried out at 64° F. to 72° F.

We have found that a suitable amount of malt sprout nutrient is provided by using malt sprouts in such amount that the weight of the malt sprouts is 1 to 2% of the weight of solid sucrose contained in the batch of liquor being treated. The required amount of malt sprouts is digested with approximately twenty times its weight of water for one and one-half hours at 190° F. to 212° F. The water-extract is filtered off by gravity through a bed of sand and dropped while hot into the batch of sucrose liquor that is to be bacteriologically treated to produce dextran. The liquor is, of course, brought to incubation temperature before inoculation with the *Leuconostoc mesenteroides*. Where concentrated steepwater is used as the vegetable protein food, we have found that 0.3% steepwater solids on sucrose solids is sufficient to bring about a rapid production of dextran. The density of the steepwater is reduced to about 25° Brix and sterilization is accomplished by boiling the diluted product.

For rapid production of dextran, we have found it advantageous to maintain the pH of the liquor between 8.0 and 5.0. This pH may be maintained by the addition of sufficient calcium carbonate at the beginning of the incubation. Usually 1 to 4% of calcium carbonate on the weight of the sucrose solids is sufficient to maintain the pH within this optimum range. Milk of lime may also be used as an alkaline agent to increase the pH of the liquor, but this should be added in several stages during the incubation to keep the pH within the range of 8.0 to 5.0.

We have also found that dextran gum, as produced by our process, is not strictly homogeneous in its make-up, but that it comprises fractions the viscosities of which, individually, cover a broad range. Probably dextran gum, as produced by our process, is a mixture of distinct polymers the chains of which are of various lengths. We have been able to isolate these fractions by selective alcoholic fractionation. More than this, we have found that the maintained pH of the culture liquor has a direct effect upon the viscosity of the dextran therein produced. By holding the pH of the inoculated sucrose liquor at specified restricted values within the broad range pH 3.55 (below which dextran production at 64° to 72° F. is imperceptible) to upper limit pH 8, we may control the viscosity of the gum dextran produced so as to obtain a gum in which the highly viscous fractions, or one in which less viscous fractions, predominate. As a general rule, the higher the adjusted pH of the culture liquor, the higher the viscosity of the produced gum, because of the increased proportion of fractions of high viscosity. The following table represents the results of pH variation in otherwise identical Leuconostoc culture liquors and under otherwise identical conditions.

| pH | Viscosity (in terms of efflux time) |
| --- | --- |
| 3.55 | 27.6″ |
| 4.0 (.25% CaCO₃) | 1′0″ (slow dextran formation; 166 hours required for conversion). |
| 4.3 | 11′30″ |
| 4.6 | 30′45.8″ |
| 4.8 | 38′49.2″ After 72 hours for conversion. |
| 5.6 | 47′23.0″ |
| 6.0 (4% CaCO₃) | 52′50″ |

We have found that the present process, especially where using either steepwater nutrient or malt sprout nutrient, produces in three or four days as much dextran gum as can be obtained in three or four weeks by previously known processes. Upon the completion of our bacteriological process, most of the sucrose has been converted into dextran (and by-products). By known procedure, such as dialysis and alcoholic precipitation, the dextran may be freed from the other constituents of the liquor for utilization in any desired way. In the alternative, we steriliz_ the culture liquor and blend it with sucrose to obtain sugar syrup of high viscosity. It may, also, be evaporated or spray dried.

We will now give a first example of our process for preparing our high viscosity sugar syrup. A 500 cc. portion of sterile 25° Brix sucrose liquor, fortified with powdered calcium carbonate and sterile water extract of malt sprouts or diluted steepwater in the amounts previously mentioned, is inoculated with a pure culture slant of *Leuconostoc mesenteroides* and incubated at 64°–72° F. for two or three days, being agitated intermittently to keep the carbonate in suspension. During this time, the bacteria propagate themselves and the developing dextran markedly increases the viscosity of the liquor. The 500 cc. portion is then used as an inoculum for ten times its own volume of 25° Brix sucrose liquor fortified as above with vegetable protein nutrient, pH-adjusted with calcium carbonate, and cooled to incubation temperature. When this volume has developed a healthy activity, which will usually be in two or three days, it in turn serves as inoculum for ten times its own volume. Thus the size of the batch may be carried to any desired volume.

We have found a 10% inoculation to be satisfactory. However, by increasing the amount of nutrient and incubating at the upper incubation temperatures, as little as 2% of inoculum will suffice.

The final volume of sucrose liquor to be converted is incubated until the desired degree of conversion has been obtained. Then this culture liquor is heated to 190° F. to inactivate the organisms, after which it is blended with the necessary sucrose solids (in syrup form if desired) to produce our high viscosity sugar syrup.

Starting with a batch of typical sucrose liquor, and allowing the bacteriological process to continue long enough to affect substantially complete utilization of the sucrose in the production of dextran, we have previously approximated the content by weight of the solids in the processed culture liquor to be:

| | Per cent |
| --- | --- |
| Dextran | 50 |
| Dextrose | 6 |
| Levulose | 36 |
| Sucrose | 2 |
| Undetermined non-sugars | 6 |

Subsequently, with careful processing and with more refined methods of analysis, we have determined the approximate content, by weight, of the solids in fully-converted culture liquor to be:

| | Per cent |
| --- | --- |
| Dextran | 44 |
| Dextrose | 6 |
| Levulose | 36 |
| Sucrose | (Trace) |
| Undetermined non-sugars | 12 |

Such a culture liquor may be blended with sucrose in an amount as high as six times the weight of the culture liquor solids, and give a finished syrup of approximately 70° Brix and a viscosity of 3000 centipoise at 770 F.

Ordinarily we do not wait for complete production of dextran in the final volume of culture liquor, since enough dextran for our purpose is produced by the end of three or four days. Usually, therefore, we then inactivate the organisms by heating the culture liquor to 190° F. To obtain a final syrup of 70° Brix and a viscosity of 3000 centipoise at 77° F., we add sucrose solids equal to three or four times the weight of the culture solids and evaporate under vacuum to 70° Brix. The composition by weight of a typical batch of such finished syrup, which we will call syrup A, was:

| | | |
|---|---|---|
| Refractometer Brix | degrees | 70.00 |
| Sucrose | per cent | 58.98 |
| Dextrose | do | 1.00 |
| Levulose | do | 4.60 |
| Total sugars | do | 64.58 |
| Non-sugars (mostly dextran) | do | 5.42 |
| Water | do | 30.00 |

The density and viscosity of the finished syrup can be varied by altering the amount of sucrose solids added in blending and shifting the point to which evaporation is carried.

We will now give a second example of our process of producing high viscosity sugar syrup. The desired final volume of converted or culture liquor is preselected. Using the percentages specified in the first example of our process, calculation is then made as to the necessary amounts of nutrient (either malt sprout or steepwater) and calcium carbonate. The entire calculated amount of nutrient and calcium carbonate for the final volume is added to an initial volume of 10° Brix sucrose liquor, this initial volume being equal to only a fraction of the preselected final volume. This initial volume of liquor is given a 2% inoculation with 10° Brix active culture of the *Leuconostoc mesenteroides*. Incubation is then carried on for 24 hours at 68° F. to 72° F. Thereafter the density of the culture liquor is increased by continuous or intermittent addition of sterile 68° Brix sucrose liquor cooled to the incubation temperature. This addition of 68° Brix liquor is spread over two or three days, the total amount added being sufficient to bring the culture liquor volume to the preselected final volume and the culture liquor Brix to 35° Brix. Incubation of the 35° Brix culture liquor is allowed to continue from 24 to 48 hours. Intermittent agitation is used to keep the calcium carbonate in suspension.

35° Brix is the highest final culture liquor density that we have used. Of course, lower Brix values may be used, and as far as we know higher Brix values may be used. While we prefer 10° Brix for the initial volume of culture liquor, higher values up to 25° Brix may be used for the initial volume, the final volume being increased to 35° Brix as above described.

At the end of the incubation period the culture is heated to 190° F. to inactivate the organisms and granulated sugar may be added in the ratio of 3-4 times as much sugar solids as solids in the final culture. The addition of dry sugar will lower the temperature but with agitation the sugar will dissolve at 160°-170° F. The higher density of the final culture has the advantage of yielding a finished syrup of 70° Brix without the necessity of further evaporation. The composition of the finished syrup will be much the same as given in the first example, with viscosity of 3000 centipoises measured at 77° F.

TABLE I

*Comparative viscosity of a sucrose-invert sugar syrup and our high viscosity syrup at various densities*

| Refractometer Brix, degrees | Viscosity in centipoises measured at 77° F. ||
|---|---|---|
| | Sucrose-invert sugar syrup | Our high viscosity syrup |
| 78 | 3,000 | |
| 77 | 1,350 | |
| 76 | 890 | |
| 75 | 640 | |
| 74 | 510 | |
| 72 | 370 | |
| 70 | 270 | 3,000 |
| 68 | 186 | 2,000 |
| 67 | 160 | 1,500 |
| 66 | 130 | 1,200 |
| 65 | 115 | 1,000 |
| 62 | 62 | 600 |

TABLE II

*Effect of variation in dextran content upon viscosity of our high viscosity syrup*

| Dextran content | Brix | Viscosity in centipoise at 77° F. | Brix of sucrose-invert sugar having same viscosity |
|---|---|---|---|
| | Degrees | | Degrees |
| Twice that of syrup A | 70 | 8,800 | 79.4 |
| As in syrup A | 70 | 3,000 | 78.0 |
| Half that in syrup A | 70 | 1,150 | 76.6 |

From the above tables it will be seen that our syrup, density for density, has a very much higher viscosity than sucrose-invert sugar syrup. Compared to other processes known to us, our process effects a greatly increased production of dextran and produces it in a much shorter time. Our high viscosity syrup is stable against crystallization, and stabilizes foodstuffs in which it is used. For best characteristics in these and other respects we keep the composition of the solids in our high viscosity syrup within the following range of approximate values:

| | Per cent |
|---|---|
| Sucrose | 93.0 to 72.0 |
| Dextrose | 0.4 to 1.7 |
| Levulose | 2.6 to 10.3 |
| Dextran | 3.6 to 14.3 |
| Non-carbohydrate non-sugars | 0.4 to 1.7 |

While for most purposes the sterile culture liquor may be employed straight or condensed by evaporation, for some specialized uses, or for convenience in shipping and storage, a substantially completely dehydrated product has been prepared by spray drying. Our invention, accordingly, contemplates such stabilizing agent in either the aqueous or dry state.

What we claim is:

1. A stabilizing addition agent for inhibiting the crystallizing tendency of a sucrose-rich syrup, comprising: a sterile *Leuconostoc mesenteroides* culture liquor product having a solid content of approximately 50% dextran, 36% levulose, 6% dextrose, 2% sucrose and 6% non-sugars.

2. A stabilizing addition agent for inhibiting the crystallizing tendency of a sucrose-rich syrup, comprising: a sterile *Leuconostoc mesenteroides* culture liquor product having a solid content of 3.6% to 44% dextran, 2.6% to 36% levulose, 0.4% to 6% dextrose, 0.4% to 12% non-carbohydrates and the remainder sucrose.

3. An improved crystallization-resisting sugar syrup comprising a sterile Leuconostoc mesenteroides culture liquor fortified with sucrose and having a solid content comprising 93.0% to 72.0% sucrose, 0.4% to 1.7% dextrose, 2.0% to 10.3% levulose, 3.6% to 14.3% dextran and 0.4% to 1.7% non-carbohydrates.

4. The method of making a dextran-stabilized high-viscosity sucrose syrup which comprises: inoculating a sucrose solution having a density of between 10° and 35° Brix with dextran-producing bacteria of the genus Leuconostoc to provide a culture liquor, nutrifying said culture liquor with a vegetable protein to stimulate the dextran-producing activity of the bacteria, maintaining the pH of the culture liquor between 8.0–5.0 and incubating the culture at a temperature between 64° and 72° F. until the dextran produced thereby constitutes the predominant solid of the liquor, then heating the culture liquor to inactivate the Leuconostoc bacteria, and finally blending said thus inactivated culture liquor with sucrose in an amount providing a predominantly sucrose syrup having a solid content of between 3.6% and 14.3% dextran.

5. In a process for producing dextran by the action of Leuconostoc mesenteroides upon the sucrose in a sucrose-rich solution, the improvement which comprises; conversion in less than a week of the major portion of the sucrose into dextran and by-products by nourishing the Leuconostoc mesenteroides with a vegetable protein nutrient which stimulates the dextran-producing activity of the Leuconostoc mesenteroides, and maintaining the thus-nutrified culture liquor within a pH range of 8.0–5.0 and a temperature range of 64°–72° F. during said conversion.

6. The process for producing a repid and high yield of dextran from sucrose by the action of Leuconostoc mesenteroides upon the sucrose in a sucrose-rich solution, which comprises: preparing a sucrose solution of between 10° and 25° Brix, nutrifying said solution by adding thereto a minor quantity of vegetable protein which stimulates the dextran-producing activity of Leuconostoc mesenteroides, maintaining the pH of the nutrified sucrose solution within the range 8.0–5.0, inoculating the solution with a culture of Leuconostoc mesenteroides, incubating the inoculated solution at a temperature between 64° and 72° F., and fortifying the sucrose content of the solution by adding sucrose to the solution as incubation continues and the Leuconostoc mesenteroides effect conversion of the sucrose in the solution to dextran.

7. The process for producing a rapid and high yield of dextran from sucrose by the action of Leuconostoc mesenteroides upon the sucrose in a sucrose-rich solution, which comprises: preparing a sucrose solution of between 10° and 25° Brix, nutrifying said solution by adding thereto a minor quantity of vegetable protein which stimulates the dextran-producing activity of Leuconostoc mesenteroides, maintaining the pH of the nutrified sucrose solution within the range of 8.0–5.0, inoculating the solution with a culture of Leuconostoc mesenteroides, incubating the inoculated solution at a temperature between 64° and 72° F., and maintaining the sucrose content of the solution above a predetermined value during the major portion of the incubation period by periodically adding sucrose to the solution in compensation for the progressive conversion of sucrose to dextran.

8. The process for producing a rapid and high yield of dextran from sucrose by the action of Leuconostoc mesenteroides upon the sucrose in a sucrose-rich solution, which comprises: preparing a sucrose solution of between 10° and 25° Brix, nutrifying said solution by adding thereto a minor quantity of vegetable protein which stimulates the dextran-producing activity of Leuconostoc mesenteroides, maintaining the pH of the nutrified sucrose solution within the range 8.0–5.0, inoculating the solution with a culture of Leuconostoc mesenteroides, incubating the inoculated solution at a temperature between 64° and 72° F., and increasing the sucrose content of the solution during the major portion of the incubation period by successively adding sufficient sucrose to offset the sucrose loss due to conversion into dextran and to provide a solution at the termination of the incubation period which has a density of more than 25° Brix.

9. The process for producing a rapid and high yield of dextran from sucrose by the action of Leuconostoc mesenteroides upon the sucrose in a sucrose-rich solution, which comprises: preparing a sucrose solution of between 10° and 25° Brix, nutrifying said solution by adding thereto a minor quantity of vegetable protein which stimulates the dextran-producing activity of Leuconostoc mesenteroides, maintaining the pH of the nutrified sucrose solution within the range 8.0–5.0, inoculating the solution with a culture of Leuconostoc mesenteroides, incubating the inoculated solution at a temperature between 64° and 72° F., and increasing the sucrose content of the solution during the major portion of the incubation period by successively adding sufficient sucrose to offset the sucrose loss due to dextran production and to provide a solution at the termination of the incubation period having a Brix of more than 25° wherein the dextran is the predominant solute.

10. In a process of producing dextran by the action of Leuconostoc mesenteroides upon the sucrose in a sucrose-rich solution, the improvement which comprises: conversion of a substantial portion of the sucrose into dextran of a definite preselected viscosity and by-products by nourishing the Leuconostoc mesenteroides at a temperature of 64°–72° F. with a vegetable protein-rich nutrient while closely maintaining the pH of the medium at a narrow value falling within the broad range 4 to 8, which pH value is such as to insure production of dextran of the preselected viscosity.

D. V. WADSWORTH.
MARY F. HUGHES.

Certificate of Correction

Patent No. 2,409,816.

October 22, 1946.

DANIEL V. WADSWORTH ET AL.

It is hereby certified that errors appear in the printed specification of the above numbered patent requiring correction as follows: Column 2, line 22, for the word "use" read *us*; column 4, line 75, for "770 F." read *77° F.*; column 7, line 5, claim 3, for "2.0%" read *2.6%*; line 29, claim 5, after "comprises" strike out the semicolon and insert instead a colon; line 38, claim 6, for "repid" read *rapid*; and that the said Letters Patent should be read with these corrections therein that the same may conform to the record of the case in the Patent Office.

Signed and sealed this 21st day of January, A. D. 1947.

[SEAL]

LESLIE FRAZER,
*First Assistant Commissioner of Patents.*